2,874,024

PREPARATION OF POTASSIUM BOROHYDRIDE

George L. Cunningham, Cleveland, Ohio, and John M. Bryant and Emily M. Gause, San Antonio, Tex., assignors to Callery Chemical Company, Pittsburgh, Pa., a corporation of Pennsylvania No Drawing. Application December 1, 1954
Serial No. 472,535

5 Claims. (Cl. 23—14)

This invention relates to a process whereby sodium borohydride ($NaBH_4$) is converted into potassium borohydride ($KBH_4$). More particularly, it relates to a process whereby sodium borohydride is reacted with potassium oxalate ($K_2C_2O_4$) in an aqueous solution containing an amine such as n-butylamine to produce potassium borohydride and sodium oxalate.

Potassium borohydride has become increasingly important in recent years because of its use as a reducing agent and as an intermediate in the preparation of other boron containing compounds. Several methods for preparing potassium borohydride have been developed among which are the reaction of diborane with a 40% aqueous solution of potassium hydroxide at 0° C. or the reaction of potassium, hydrogen and boric oxide in a ball mill at 350° C. These methods are not entirely feasible because the starting materials are either not readily available or the yields are low. Significant improvements have been made in preparing potassium borohydride in high yields which improvements are the subject of this invention and will be fully and completely described herein.

It is an object of this invention to provide a new and improved method for preparing potassium borohydride from the cheaper and more readily available sodium borohydride in substantially quantitative yield by reaction with potassium oxalate in an aqueous solution containing an amine dissolved therein.

Other objects of this invention will become apparent from time to time throughout the specification and claims which follow.

This new and improved method will be described more fully in the specification and the novelty thereof will be particularly pointed out and distinctly claimed.

This invention is based upon our discovery that if sodium borohydride and potassium oxalate are reacted in an aqueous solution about 90% of the sodium ions are precipitated as sodium oxalate leaving a solution of potassium borohydride containing about 10% of sodium oxalate from which solution substantially pure potassium borohydride may be recovered. We have also discovered that the addition of an amine such as n-butylamine to this aqueous solution will cause a larger percentage of the sodium oxalate to precipitate. Further addition of amine to the filtrate will cause the potassium borohydride to precipitate.

In carrying out this reaction we have found that the mixture of potassium borohydride and sodium oxalate which results can also be separated by a "sink and float" procedure based on the difference in specific gravity between these two compounds. The specific gravity of potassium borohydride at 25° C. is 1.11 while the specific gravity of sodium oxalate at 25° C. is 2.27. Therefore, any inert liquid with a specific gravity within these limits can be used to effect a separation. Since the specific gravity of sodium oxalate is considerably higher than the specific gravity of potassium borohydride, there are a number of inert liquids which can be used to separate these two compounds. We have found that chlorinated hydrocarbons are particularly effective for this purpose. Specifically, we have found the following to be satisfactory: chloroform, carbon tetrachloride, dichloroethane, trichloroethane, tetrachloroethane, pentachloroethane, dichloroethane, tetrachloroethane, pentachloroethane, dichloroethylene, trichloroethylene, trichloropropane, ethylene chlorobromide and ethylene dichloride. Under the conditions used in this reaction these liquids do not react with any of the reactants used.

Although this process may be carried out in a number of ways, the preferred method of procedure is as follows: one mol of potassium oxalate is added to two mols of sodium borohydride in enough water to effect solution. About 80% of the sodium ions are thereupon precipitated as sodium oxalate. To this solution is added enough amine such as n-butylamine so that the aqueous phase contains about 25% of the amine by weight. The slurry is stirred to complete the reaction and filtered to remove about 95% of the sodium ions as sodium oxalate. To the mother liquor containing all the potassium borohydride is added enough amine so that the solvent contains 70% amine by weight thus causing the potassium borohydride to precipitate. By filtering this slurry over 99% of the potassium borohydride is obtained as the anhydrous salt. This wet cake is washed with methanol containing about 1% potassium hydroxide by weight. The washed cake is dried under vacuum at room temperature to produce a high purity potassium borohydride. The mother liquor is distilled to reduce the amine content to 25% and the cycle repeated. Since potassium borohydride is practically insoluble in pure n-butylamine this solvent may be used to wash the wet cake. However, a methanol solution containing 1% potassium hydroxide is more efficient and less expensive than n-butylamine in removing traces of impurities from the wet cake.

In one experiment 184 g. of potassium oxalate monohydrate and 75.6 g. of sodium borohydride were added to 200 g. of water and the slurry was stirred at 25° C. for four hours. After this time 800 g. of n-butylamine were added and the slurry was stirred an additional four hours. When the slurry was filtered at 25° C. the solid cake contained 130 g. of sodium oxalate and 107 g. of potassium borohydride plus a small amount of solvent. This wet cake was washed with pure n-butylamine to remove the aqueous solvent. The cake was dried to recover the n-butylamine. The dried cake was placed in carbon tetrachloride. The potassium borohydride crystals floated to the top and were removed. These crystals were dried to recover the carbon tetrachloride and substantially pure potassium borohydride. The slurry of sodium oxalate in carbon tetrachloride was filtered and dried to recover substantially pure sodium oxalate and carbon tetrachloride. The mother liquor was distilled to remove the n-butylamine. The residue which was water containing a small amount of sodium oxalate, potassium borohydride and n-butylamine was almost identical to the starting liquor to which more potassium oxalate and sodium borohydride were added and the cycle repeated.

In another experiment, 83.1 g. of potassium oxalate and 37.8 g. of sodium borohydride were added to a solution containing 280 g. of water and 93 g. of n-butylamine. The slurry was stirred for four hours and filtered to remove 63.5 g. of sodium oxalate which represents 94.7% of the sodium ions in the slurry. To the mother liquor was added 1027 g. of n-butylamine and the slurry was stirred for another four hours. The slurry was filtered to remove 44.2 g. of potassium borohydride containing some sodium oxalate. The wet crystals were washed with a solution of methanol containing 1% potassium hydroxide by weight. The washed crystals were dried under vacuum at room temperature to give a product containing over 96% potassium borohydride. The mother liquor was distilled to recover substantially all of the added n-butylamine. To the distilled liquor was added 68.1 g. of potassium oxalate and 31 g. of sodium borohydride and the process repeated. Since only potassium borohydride and sodium oxalate are removed during the cycle the yields are substantially 100%.

Other amines which can be used in place of n-butylamine in this process include methylamine, ethylamine, diethylamine, isopropylamine, pyridine and morpholine.

While several embodiments of this invention have been described it is to be understood that within the scope of the claims appended hereto this invention may be practiced otherwise than as specifically described.

Having thus described our invention fully and completely as required by the patent statutes what we desire to claim and secure by Letters Patent of the United States is:

1. A method of preparing potassium borohydride which comprises reacting sodium borohydride with potassium oxalate in an aqueous solution to precipitate the sodium oxalate formed, adding a sufficient amount of a lower aliphatic amine to the slurry to separate the potassium borohydride, filtering the slurry to obtain a mixture of potassium borohydride and sodium oxalate, adding to said mixture an inert liquid having a specific gravity between 1.11 and 2.27 which will not react with nor dissolve either component of said mixture and recovering the potassium borohydride which rises to the surface of said liquid.

2. A method of preparing potassium borohydride which comprises reacting sodium borohydride with potassium oxalate in an aqueous solvent, removing the sodium oxalate precipitated, evaporating said solvent to recover a mixture of sodium oxalate and potassium borohydride, treating said mixture with an inert liquid having a specific gravity between 1.11 and 2.27 which will not react with nor dissolve either component of said mixture and recovering the potassium borohydride which rises to the surface of said liquid.

3. A method of preparing potassium borohydride which comprises reacting sodium borohydride with potassium oxalate in an aqueous solution including about 25 percent by weight, based on the solution, of an amine selected from the group consisting of the lower aliphatic amines, pyridine and morpholine, removing the sodium oxalate which precipitates and recovering the potassium borohydride from the resulting solution.

4. A method of preparing potassium borohydride which comprises reacting stoichiometric proportions of potassium oxalate and sodium borohydride in an aqueous solution containing about 25 percent by weight of n-butyl amine, filtering the resulting precipitated sodium oxalate from the solution to obtain a filtrate free of precipitated sodium oxalate, adding additional n-butyl amine to the filtrate and recovering the potassium borohydride which precipitates.

5. A method according to claim 4 in which the amount of n-butylamine added to the filtrate is about 70% by weight of the filtrate.

References Cited in the file of this patent

UNITED STATES PATENTS

| | | |
|---|---|---|
| 2,726,926 | Paul et al. | Dec. 13, 1955 |
| 2,741,540 | Brogdon et al. | Apr. 10, 1956 |

FOREIGN PATENTS

| | | |
|---|---|---|
| 1,046,081 | France | July 8, 1953 |

OTHER REFERENCES

Lange: Handbook of Chemistry, 5th ed., pages 226, 227, 242, and 243 (1944), pub. by Handbook Publishers, Inc., Sandusky, Ohio.

Nature, vol. 173, No. 4394, pages 125–6 (January 16, 1954).

Metal Hydrides Inc., Bulletin 502A on $NaBH_4$, 2 pages. Rec'd in Patent Office February 15, 1950.

Banus: J. A. C. S., vol. 76, July 20, 1954, page 3848.